(12) United States Patent
Lekies et al.

(10) Patent No.: US 11,750,635 B2
(45) Date of Patent: Sep. 5, 2023

(54) MINIMIZING PRODUCTION DISRUPTION THROUGH A SCAN RULE ENGINE

(71) Applicant: Google LLC, Mountain View, CA (US)

(72) Inventors: Sebastian Lekies, Zurich (CH); David Aslanian, Palo Alto, CA (US); Claudio Criscione, Zurich (CH)

(73) Assignee: Google LLC, Mountain View, CA (US)

( * ) Notice: Subject to any disclaimer, the term of this patent is extended or adjusted under 35 U.S.C. 154(b) by 364 days.

(21) Appl. No.: 16/933,345

(22) Filed: Jul. 20, 2020

(65) Prior Publication Data

US 2022/0021696 A1 Jan. 20, 2022

(51) Int. Cl.
*H04L 9/40* (2022.01)

(52) U.S. Cl.
CPC .......... *H04L 63/1433* (2013.01); *H04L 63/20* (2013.01)

(58) Field of Classification Search
CPC ............................ H04L 63/1433; H04L 63/20
USPC ............................................................. 726/1
See application file for complete search history.

(56) References Cited

U.S. PATENT DOCUMENTS

| | | | |
|---|---|---|---|
| 6,745,356 B1 * | 6/2004 | Wong | G01R 31/318555 326/16 |
| 2004/0268145 A1 * | 12/2004 | Watkins | H04L 63/1433 714/E11.207 |
| 2012/0144494 A1 | 6/2012 | Cole et al. | |
| 2012/0254958 A1 * | 10/2012 | Budampati | H04L 61/5092 726/6 |
| 2013/0167238 A1 | 6/2013 | Russell et al. | |
| 2013/0269028 A1 | 10/2013 | Nakawatase et al. | |
| 2017/0300693 A1 | 10/2017 | Zhang et al. | |

OTHER PUBLICATIONS

International Search Report and Written Opinion for International Application No. PCT/US2020/064841 dated Apr. 6, 2021. 13 pages.
International Preliminary Report on Patentability for International Application No. PCT/US2020/064841 dated Feb. 2, 2023. 8 pages.

* cited by examiner

*Primary Examiner* — Anthony D Brown
(74) *Attorney, Agent, or Firm* — Lerner David LLP

(57) ABSTRACT

This technology is directed to a rules based engine for managing network-based scanning of devices on a network to minimize disruptions to the network. One or more processors may identify an initial group of network devices from a set of network devices, the initial group of network devices being identified in accordance with a rule set, and initiate a scan of the initial group of network devices. The one or more processors may determine, in accordance with the rule set, an additional group of network devices from the set of network devices to be scanned and initiate a scan of the additional group of network devices. The steps may be repeated until all network devices in the set of network devices are scanned in accordance with the rule set.

18 Claims, 5 Drawing Sheets

| Inventory - 310 | Role - 320 |
|---|---|
| Switch 1 | Connect Servers 1 and 2 to Router 1 |
| Switch 2 | Connect Server 3 to Router 2 |
| Switch 3 | Connect Server 4 to Router 3 |
| Server 1 | Serve Application A to Users in Location X — Redundant with Server 2 |
| Server 2 | Serve Application A to Users in Location X — Redundant with Server 1 |
| Server 3 | Serve Application A to Users in Location Y |
| Server 4 | Serve Application B to Users in Locations X and Y |
| Router 1 | Connect Switch 1 to the Network |
| Router 2 | Connect Switch 2 to the Network |
| Router 3 | Connect Switch 3 to the Network |

MINIMIZING PRODUCTION DISRUPTION THROUGH A SCAN RULE ENGINE

BACKGROUND

Identifying vulnerabilities in a network may provide an opportunity for a network administrator to correct any vulnerability before it is exploited by a malicious actor. One way to identify vulnerabilities is to use black box vulnerability scanning. Black box vulnerability scanning over a network is a common practice to verify the security state of the network. Black box vulnerability scanning may include scanning a network for vulnerabilities from outside the network and without any knowledge of what is included in the network. In this regard, black box vulnerability scanning attempts to mimic the way a hacker or other malicious actors would try to exploit a network, without prior knowledge of the network.

Network devices are known to exhibit unstable behavior when subjected to network scanning, such as done in black box vulnerability scanning. For example, network scanning may implement the use of unexpected protocols or increase the load on the network devices, which may, in some instances, have an adverse effect on network devices. For instance, the use of unexpected protocols or increased loads may reduce the performance, freeze, or cause network devices, or services executing on the network devices, to shut down or reboot. In instances when a network device or devices experience adverse effects from scanning, access to services provided through the network may be limited or even inaccessible. However, since network scanning provides important security benefits to networks, and in some instances is mandated by certain compliance regimes, network administrators continue to conduct network scans, while trying to reduce the impact the scans have on network devices and the overall network.

To reduce the impact the network scans may have, network administrators may randomly select a subset of network devices for scanning and/or run network scans during off-peak times. However, randomly selecting a subset of network devices may not provide a realistic picture of the security state of the network, as the selected subset of network devices may not be representative of the entire network. Moreover, the randomly selected subset of devices may still result in adverse impacts to the network since the selected subset of devices may be responsible for delivering a given service or handling a major network link. In the event one or more of the selected subset of devices goes down, there may be a risk the service or network link may become unavailable. With regard to running network scans during off-peak times, many networks are utilized at all times and have no window of tolerance for downtime, making off-peak network scans infeasible.

BRIEF SUMMARY

Aspects of the disclosure are generally directed to a rules based engine for managing network-based scanning of devices on a network to minimize disruptions to the network. According to one embodiment, one or more processors may identify an initial group of network devices from a set of network devices, the initial group of network devices being identified in accordance with a rule set; initiate a scan of the initial group of network devices; determine, in accordance with the rule set, an additional group of network devices from the set of network devices to be scanned after the scan of the initial group of network devices; initiate a scan of the additional group of network devices; and these steps until all network devices in the set of network devices are scanned in accordance with the rule set.

In some examples, identifying the initial set of network devices includes identifying the largest number of network devices that can be scanned in accordance with the rule set. In some instances, the rule set includes at least one rule identifying one or more network devices than cannot be scanned at the same time.

In some examples, initiating the scan of the initial group of network devices includes providing instructions to one or more scanning devices, the instructions including an identification of each network device in the initial group of network devices. In some instances, the instructions further identify which network device, in the initial group of network devices, each scanning device of the one or more scanning devices is to scan. In some instances, prior to initiating the scan of the additional group of network devices, a confirmation that the scan of the initial group of network devices is complete may be received In some examples, initiating the scan of the additional group of network devices includes providing instructions to one or more scanning devices, the instructions including an identification of each network device in the additional group of network devices. In some instances, the instructions further identify which network device, in the additional group of network devices, each scanning device of the one or more scanning devices is to scan.

Another aspect of the disclosure is directed to a system comprising: one or more processors; and one or more storage devices in communication with the one or more processors, wherein the one or more storage devices contain instructions. The instructions may be configured to cause the one or more processors to: (i) identify, by one or more processors, an initial group of network devices from a set of network devices, the initial group of network devices being identified in accordance with a rule set; (ii) initiate, by the one or more processors, a scan of the initial group of network devices; (iii) determine, by the one or more processors, in accordance with the rule set, an additional group of network devices from the set of network devices to be scanned; (iv) initiate, by the one or more processors, a scan of the additional group of network devices; and repeat (iii) and (iv) until all network devices in the set of network devices are scanned in accordance with the rule set.

Another aspect of the disclosure is directed to a non-transitory computer-readable medium storing instructions, which when executed by one or more processors, cause the one or more processors to: (i) identify an initial group of network devices from a set of network devices, the initial group of network devices being identified in accordance with a rule set; (ii) initiate a scan of the initial group of network devices; (iii) determine in accordance with the rule set, an additional group of network devices from the set of network devices to be scanned; (iv) initiate a scan of the additional group of network devices; and repeat (iii) and (iv) until all network devices in the set of network devices are scanned in accordance with the rule set.

BRIEF DESCRIPTION OF THE DRAWINGS

FIG. 3 illustrates an inventory of network devices and their corresponding roles in accordance with aspects of the disclosure.

DETAILED DESCRIPTION

Overview

The technology of the present disclosure relates generally to a rules based engine for managing network-based scanning of devices on a network to minimize disruptions to the network. In this regard, constraints for how and when the devices on the network can be scanned may be identified based on information provided about the devices on the network. The constraints may minimize the effects the network scans have on the network and network devices. Based on the constraints, a rule set for scanning the network devices within the identified constraints may be developed. Scanning of the network devices may then be controlled by the rules based engine in accordance with the rule set.

The features described herein allow for scanning of network devices. In this regard, the rule set is continuously evaluated on the network device inventory. As such, the rule set may be continually reviewed such that any network devices that need to be scanned can be scanned without the need to wait a certain period of time before continuing to scan, as may occur when scanning is performed based on pre-defined schedules with estimated completion times. As such, the time to scan network devices using a rules based engine may be reduced by 30% or more relative to other known scanning techniques. Moreover, by eliminating waiting intervals between scans, the overall throughput of the infrastructure may be much higher compared to a standard setup of time-based schedules.

Example Systems

Figure 1:
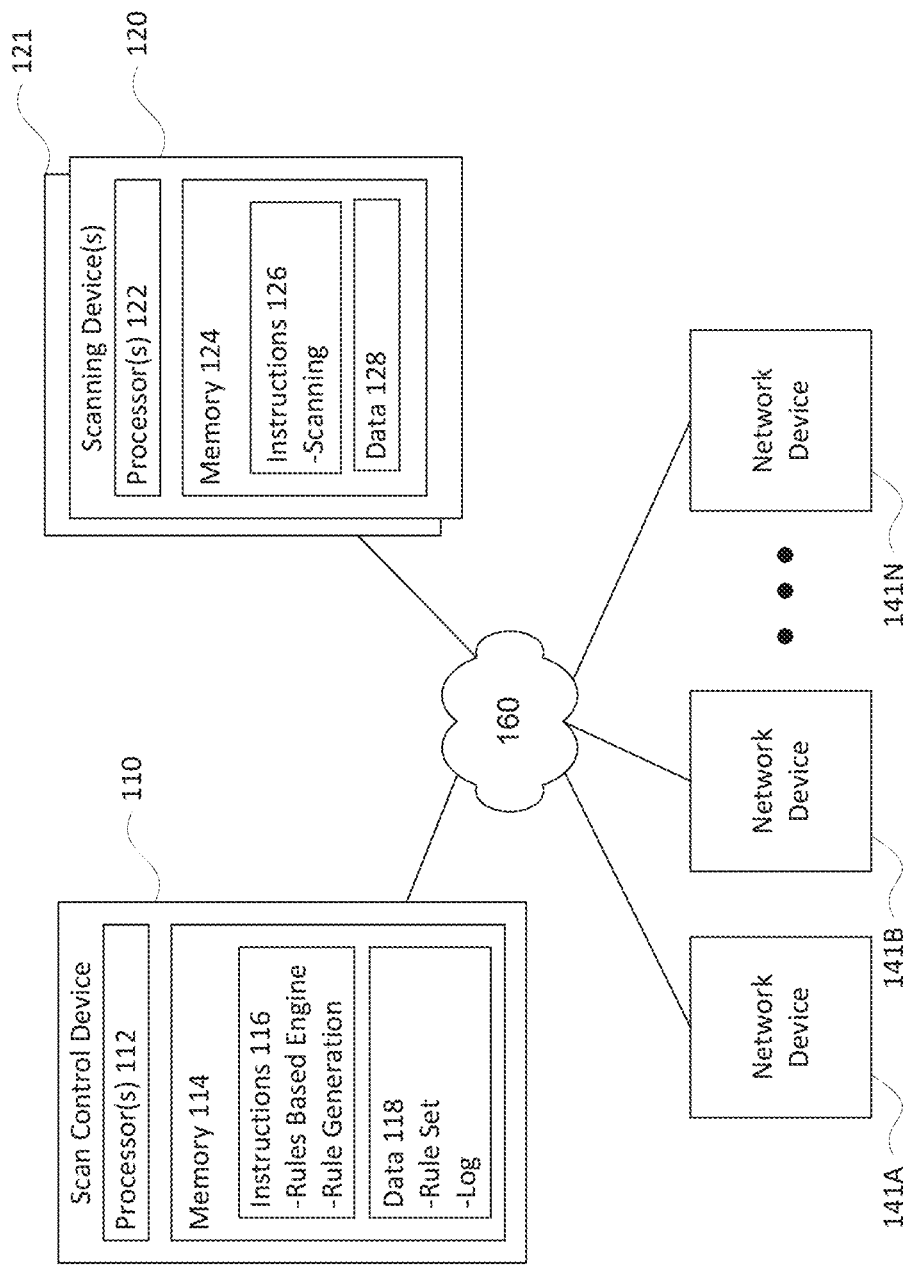
FIG. 1 is a schematic diagram of a system according to aspects of the present disclosure.

FIG. 1 illustrates an example system 100 including computing devices for performing aspects of the present disclosure. The system 100 includes network devices 141A-141N (collectively "network devices 141"), scanning devices 120, 121, and a scan control device 110, all of which are communicatively coupled to a network 160.

The network devices 141 may include switches, routers, modems, gateways, software-defined-network applications, or other such components that may be connected to or otherwise form part of the network 160. In this regard, network devices 141 may include physical devices, virtualized devices, replicas, etc. In some examples, network devices may include computing devices such as servers, general purpose computers, PDAs, tablets, mobile phones, smartwatches, terminals, set top boxes, and other such devices.

Additionally, network devices 141 may also include services that are implemented on the network devices, In some examples, network devices 141 may be coupled to other network devices to create a communication pathway to the network 160. For example, a first network device may connect to a second network device, which may connect to other network devices or directly to the network. For example, network device 141A may be a top-of-rack switch that has a set of servers attached to it. In another example, network device 141B may be a router that is attached to a plurality of switches, which in turn connect to a plurality of computing devices. Although FIG. 1 illustrates scan control device 110 and scanning devices 120, 121 as being connected directly to the network 160, the scan control device 110 and scanning devices 120, 121 may be connected to the network 160 via other network devices, such as one of network devices 141.

The scan control device 110 may contain a processor 112, memory 114, and other components typically present in general purpose computers and servers. The memory 114 can store information accessible by the processor 112, including instructions 116 that can be executed by the processor 112. Memory 114 can also include data 118 that can be retrieved, manipulated or stored by the processor 112. The memory 114 may be a type of non-transitory computer readable medium capable of storing information accessible by the processor 120, such as a hard-drive, solid state drive, flash drive, tape drive, optical storage, memory card, ROM, RAM, DVD, CD-ROM, write-capable, and read-only memories. The subject matter disclosed herein may include different combinations of the foregoing, whereby different portions of the instructions 116 and data 118 are stored on different types of media. The processor 112 can be a well-known processor or other lesser-known types of processors. Alternatively, the processor 112 can be a dedicated controller such as an ASIC.

The instructions 116 can be a set of instructions executed directly, such as machine code, or indirectly, such as scripts, by the processor 112. In this regard, the terms "instructions," "steps" and "programs" can be used interchangeably herein. The instructions 116 can be stored in object code format for direct processing by the processor 120, or other types of computer language including scripts or collections of independent source code modules that are interpreted on demand or compiled in advance.

The instructions 116 may provide for generating a rule set for implementation by a rules based engine of the scan control device 110, as described herein. The instructions may also provide for a rules based engine that controls scanning of a network by issuing directives to one or more scanning devices, such as scanning devices 120, 121, as described herein.

The data 118 can be retrieved, stored or modified by the processor 112 in accordance with the instructions 116. For instance, although the system and method are not limited by a particular data structure, the data 118 can be stored in computer registers, in a distributed storage system as a structure having a plurality of different fields and records, or documents, or buffers. The data 118 can also be formatted in a computer-readable format such as, but not limited to, binary values, ASCII or Unicode. Moreover, the data 118 can include information sufficient to identify relevant information, such as numbers, descriptive text, proprietary codes, pointers, references to data stored in other memories, including other network locations, or information that is used by a function to calculate relevant data.

Although FIG. 1 functionally illustrates the processor 112 and memory 114 as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors that may or may not operate in parallel.

Scanning device 120 may be configured similarly to the scan control device 110, with a processor 122 and memory 124. For clarity, only the components of scanning device 120 are shown. Scanning device 121 may have some or all of the same components of scanning device 120. Although FIG. 1 functionally illustrates the processor 122 and memory 124 as being within the same block, it will be understood by those of ordinary skill in the art that the processor and memory may actually comprise multiple processors and memories that may or may not be stored within the same physical housing. Memory 124 may store information accessible by the processor 122, including instructions 126. Memory 124 can also include data 128 that can be retrieved, manipulated or stored by the processor 122. The instructions 126 may provide for scanning network devices, such as network devices 141 based on directives receiving from a scan control device, such as scan control device 110, as described herein.

Moreover, each computing device described herein, including scanning devices 120, 121 and scan control device 110 may have all the internal components normally found in a personal computer such as a central processing unit (CPU), CD-ROM, hard drive, and a display device, for example, a monitor having a screen, a projector, a touch-screen, a small LCD screen, a television, or another device such as an electrical device that can be operable to display information processed by a processor, speakers, a modem and/or network interface device, user input, such as a mouse, keyboard, touch screen or microphone, and all of the components used for connecting these elements to one another. Moreover, computers in accordance with the systems and methods described herein may include devices capable of processing instructions and transmitting data to and from humans and other computers including general purpose computers, servers, PDAs, tablets, mobile phones, smartwatches, network computers lacking local storage capability, set top boxes for televisions, and other networked devices.

In one aspect, scan control device 110 is a server communicating with one or more scanning devices 120, 121. In another aspect, scan control device 110 may be a general purpose computer communicating with one or more scanning devices 120, 121. In another aspect, the functions performed by the scan control device 110, described herein, can be performed by one or more applications executing on one or more computing devices, such as scanning devices 120, 121, a server, a general purpose computer, or one of the network devices 141. Likewise, the functions of the scanning devices 120, 121 may be performed by applications executing on one or more computing devices, such as scan control device 110 or one of the network devices 141. Although FIG. 1 illustrates a single scan control device 110 and two scanning devices 120, 121, the system 100 can include any number of scan control devices, scanning devices, and network devices.

The components in system 100, including scan control device 110, scanning devices 120, 121, and network devices 141 may be capable of direct and indirect communication such as over network 160. The network 160, and intervening nodes including the network devices 14 and computer components such as the scan control device 110 and scanning devices 120, 121, may include various configurations and protocols including the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 2:
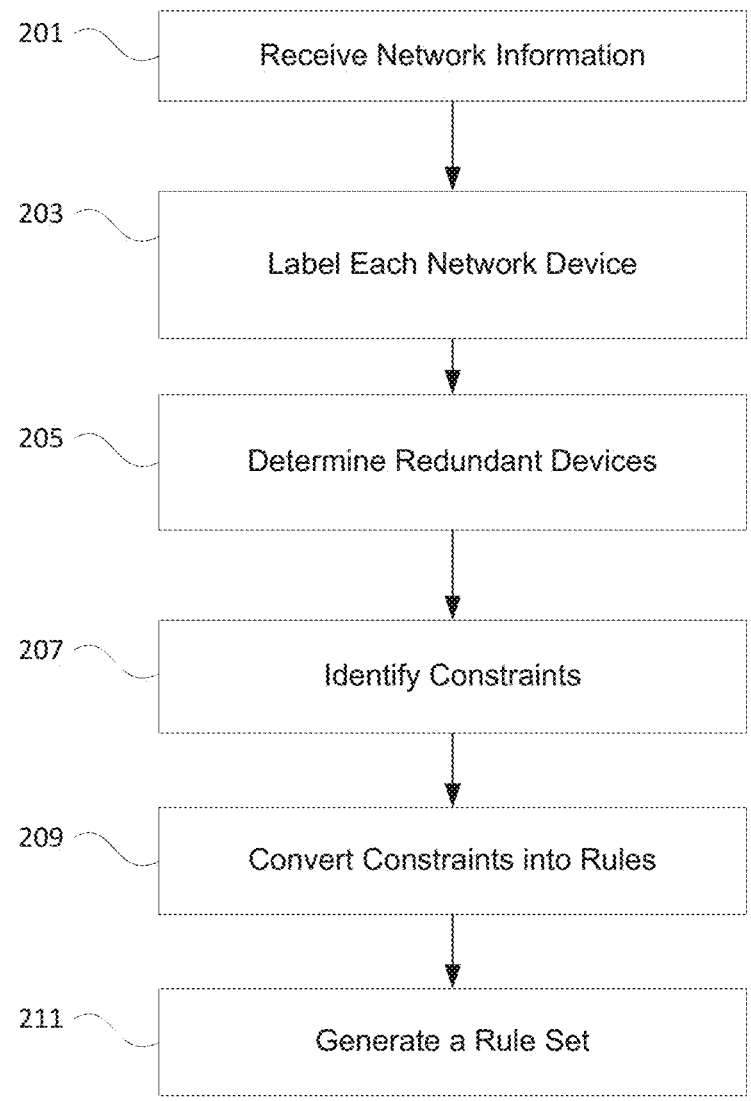
FIG. 2 illustrates an example flow diagram outlining a method of generating a rule set in accordance with aspects of the disclosure.

FIG. 2 illustrates a method 200 for generating a rule set for implementation by a rules based engine implemented in a control device, such as scan control device 110. The scan control device 110 may provide directives to scanning devices, such as scanning devices 120, 121, in accordance with a rule set in the rules based engine. The scanning devices 120, 121 may then scan network devices, such as network devices 141, in accordance with the received directives. Although the steps outlined in FIG. 2 are described as being implemented by the scan control device 110, the steps may be performed by any computing device or combination of devices. In some instances, the rule set may be generated manually by following the steps of method 200.

As described herein, the rule set may be based on constraints for how and when network devices, such as network devices 141, on a network, such as network 160, can be scanned such that the effect on the network 160 and network devices 141 is minimized. Constraints on how to conduct the network scan may be determined from information known about the network 160. In this regard, and as shown in block 201, information about the network may be provided to the scan control device 110. This information may include an inventory of network devices, a topology of the network, and the role or roles each network device plays in the network.

Figure 4:
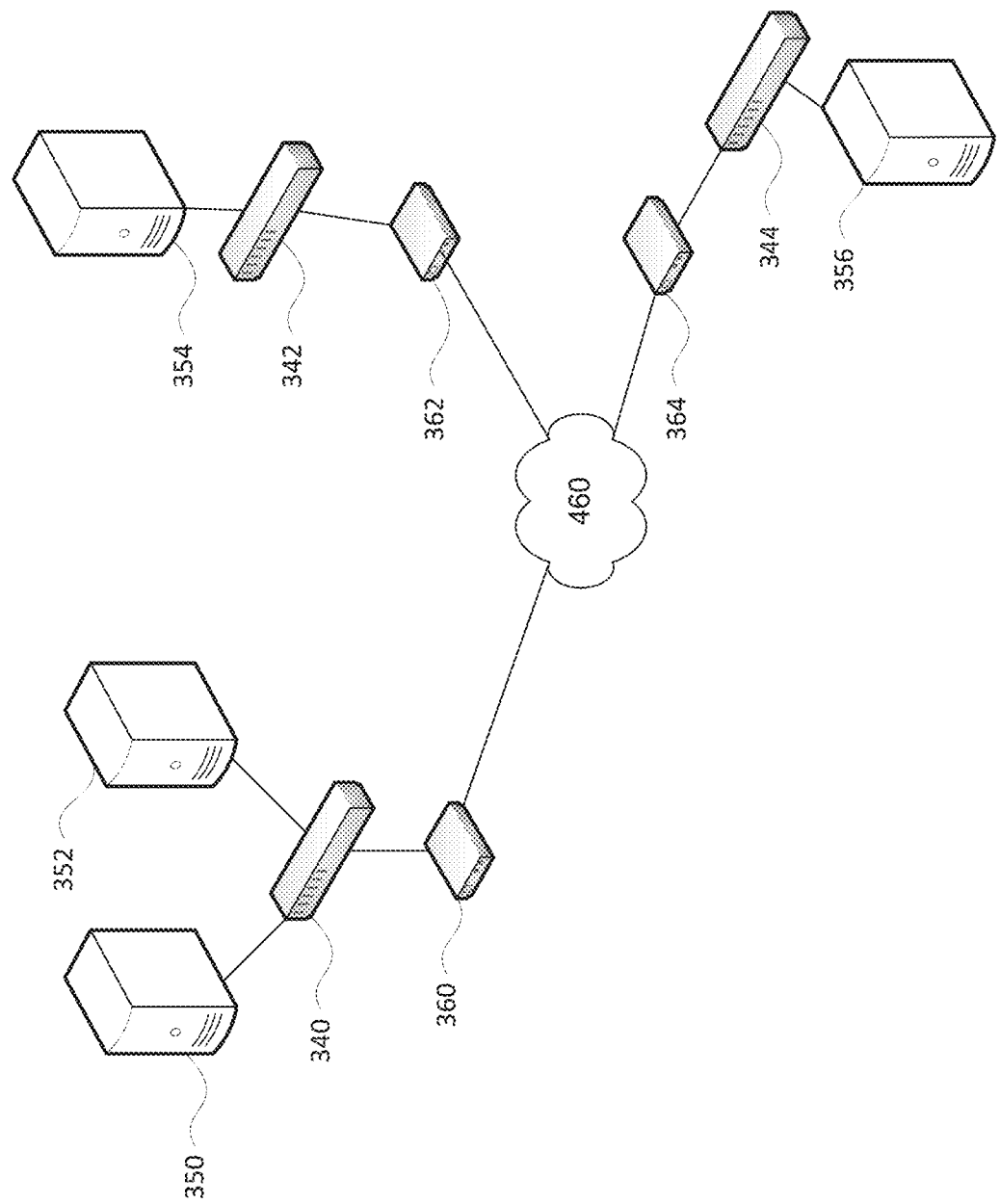
FIG. 4 illustrates an example network diagram in accordance with aspects of the disclosure.

The inventory of the network devices may include a listing of each network device on the network. For example, FIG. 3 illustrates an example inventory 310 of network devices 141 including Switch 1 (340), Switch 2 (342), Switch 3 (344), Server 1 (350), Server 2 (352), Server 3 (354), Server 4 (356), Router 1 (360), Router 2 (362), and Router 3 (364). The network topology may be an architecture or network diagram showing the interconnections and positions of the network devices on the network. FIG. 4 illustrates an example network diagram of network devices 141 on network 460, including connections between the various network devices.

The inventory of network devices 310 and the network topology may be determined by scanning a network for each device and determining the connections between each device. For instance, the scan control device 110, scanning devices 120, 121, and/or some other computing device may scan the network 460 to determine each device on the network and its relative position to other network devices. In some instances, the inventory of network devices 130 and the network topology may be provided by a network administrator or others with access to such information.

The role of each network device may be defined by the network operator or inferred from the network device's position in the network and/or the type of equipment the network device is. For example, network switch 340 may be determined to have a role of "Connecting Servers 1 and 2 to Router 1", as shown in FIG. 3, based on the purpose of a network switch being to direct data to devices that are connected to the switch. In another example a network operator may define the role of a set of servers as providing certain services to end users in a first location and another set of servers as providing the same services to end users in a second location.

Each network device may be labeled according to its role and position in the network, as shown in block 203. For example and as previously discussed, network switch 340 may be labeled with the role of "Connecting Servers 1 and 2 to Router 1". In another example, each server 350, 352, 354, and 356 on network 460 may be configured to provide an application to end users, with each server being configured to serve the application within a particular location. In this regard, a pair of the servers, such as server 1 (350) and server 2 (352) may provide the application to users in a first location, the third server, such as server 3 (354) may provide the application to users in a second location, and the fourth server, server 4 (356) may provide the application to users in a third location. The pair of servers 350, 352 may be assigned labels indicating that they are positioned in the first location and their role is to serve the application. The third server 354 may be labeled to indicate that it is in the second location and its role is to serve the application, while the fourth server 356 may be labeled to indicate that it is in the third location and its role is to serve the application.

Network devices that have the same labels may be inferred to provide redundancy for their role. In this regard, network devices having the same labels may be considered replicas. Each redundant device may be identified for use in generating constraints, as shown in block 205. For example, the pair of servers 350, 352 may be considered redundant since they provide the same users in the first location with the same application. That is, each server in the pair of servers is used for the same purpose and provides redundancy to the network. In this regard, if one of the servers in the pair of servers 350, 352 encounters a problem during scanning, such as the server shutting down or experiencing a period of reduced performance, or a service executing on the server shutting down or experience a period of reduced performance, the other server may be used in place of the server that goes down or has reduced performance. In contrast, the third and fourth servers may not be considered replicas because they are labeled as serving different locations. Each redundant device may be labeled as such, as shown in FIG. 3, where Server 1 (350) is labeled as redundant to Server 2 (352) and Server 2 (352) is labeled as redundant to Server 1.

Based on the labels, including the identification of redundant network devices, a set of constraints may be determined, as shown in block 207 of FIG. 2. Each constraint may be a limitation for scanning the network that reduces the possibility of causing a network outage or a degradation of service beyond a certain threshold. To determine the constraints, graphs of the network devices and their labels may be generated. Graphs may be generated for each type of network device and/or for groups of different network devices. In the example above, each server 350-354 may be connected to the network by two different, redundant paths. Each path may include a switch and router, and each switch and each switch and router may be of the same or different brand and model. For instance, server 350 may connect to the network via a first path via a first switch having a first make and model and first router of a first make and model. The server 350 may also connect to the network via a second path having a second switch of a different make and model than the first switch and a second router of a different make and model than the first router.

The graphs may be partitioned using a graph partitioning algorithm. In this regard, the graphs may be partitioned based on the labels and identification of redundant network devices to identify combinations of network devices that may be scanned simultaneously, or in succession, while limiting the possibility of causing a network outage or degradation of service beyond a certain threshold, such as a throughput threshold, and regardless of the level of redundancy of a specific device. In the example above, the "redundant labels" approach would have suggested that only one router on each path can be scanned at the same time. Graph analysis instead suggests that all the devices in one path can be scanned at the same time, as long as devices on the second path are not, since the second path would provide network access to the service.

Based on the partitioned graphs, an identification of which network devices can and cannot be scanned together may be identified and the identification of which devices cannot be scanned together may represent a constraint.

Each identified constraint may be converted into a rule, as shown in block 209. Additional rules may also be defined to satisfy timing or other such considerations. In this regard, the additional rules may be based on common practice timing requirements and/or timing requirements outlined by compliance regimes. For example, an additional rule may include an expected coverage frequency that defines the interval to be enforced between network scans of each individual network device. These additional constraints may regulate the frequency of the testing and prevent scanning deemed unnecessary. The collection of rules, including the rules generated from the constraints and the additional rules, may be combined into a rule set, as shown in block 211.

A control device, such as scan control device 110, may execute a rules based engine that uses the generated rule set. In this regard, the rules based engine executing on the scan control device 110 may communicate and direct scanning devices to scan the network devices on the network in such a way that complies with the rules in the rule set. The rules based engine may continuously evaluate the rules in the rule set over all network devices and make scanning decisions based on the rules rather than solely on time-based scheduling.

Figure 5:
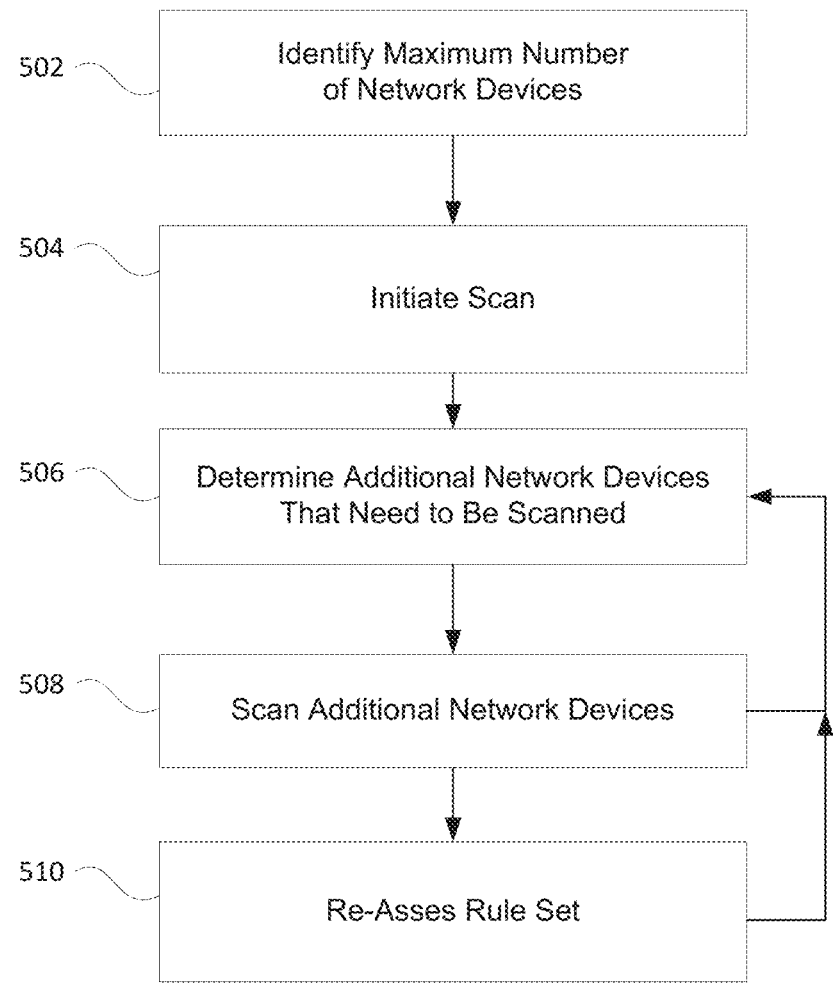
FIG. 5 illustrates an example flow diagram outlining a method of scanning a network using a rules based engine in accordance with aspects of the disclosure.

FIG. 5 illustrates a method 500 for using a rules based engine to scan network devices on a network, such as network devices 340-364 on network 460, in accordance with a rule set. In this regard, the scan control device 110 may provide directives to scanning devices, such as scanning devices 120, 121, in accordance with a rule set in the rules based engine During the first iteration of scanning, the rules based engine may identify the maximum number of network devices it is allowed to scan without violating any of the rules in the rule set, as shown in block 502. Upon determining the maximum number of devices that can be scanned in the initial stage, the rules based engine may instruct one or more scanning devices 121, 122 to initiate scanning of the identified network devices, as shown in block 504.

The rules based engine may initiate network scanning by providing scanning instructions to one or more of the scanning devices 120, 121 connected to the same network that the network devices to be scanned are also connected. The scanning instructions may include an identification of each network device to be scanned. In some instances, a single scanning device may scan all network devices. In another example, the scanning devices may allocate instructions amongst each other based on availability. For instance, each instruction may be allocated to an available scanning device regardless of location or based on location and availability. In yet another example, the instructions may include information about which scanning device should scan which network devices. The scanning devices may include computer devices programmed to perform network scanning, such as computing devices programmed with scanning software.

The scan control device 110 may keep a file outlining the positions of the scanning devices relative to the network devices. In this regard, the scan control device 110 may provide instructions to each scanning device based on its location relative to the network devices. For example, a first set of network devices may be positioned in Europe and another set of network devices may be positioned in the United States of America and a scanning device may be positioned in Europe and another may be positioned in the USA. Scanning instructions that require the scanning of devices in Europe may be sent to the scanning device positioned in Europe and scanning instructions that require the scanning of devices in the USA may be sent to the scanning device positioned in the USA.

After receiving instructions from the scan control device, the one or more scanning devices may begin scanning the network devices identified by the rules based engine in the instructions. In some instances, the scan control device 110 may conduct the scanning of the network devices. In such a scenario, the scan control device may not forward any instructions to a scanning device. In other scenarios, the scan control device 110 may allocate scanning between other scanning devices and the scan control device, itself.

The results of the scanning may be forwarded to the scan control device 110 by the scanning devices. The results of the scanning, as well as other information associated with the scanning, such as initiation time, etc., may be stored in a log in memory within the scan control device 110 or at a location remote from the scan control device. In some instances, the scanning devices may store the logs in memory within the scanning devices or at a location remote from the scanning devices, such as a remote storage location.

After completion of the first iteration, the rules based engine may identify additional network devices that need to be scanned in accordance with the rule set as shown in block 506, in view of the logged data. The rules based engine may then instruct the scanning devices to scan these additional network devices, as shown in block 508. This process may iterate in accordance with the rules set until the network devices on the entire network, or a portion of the network, are scanned, as further shown in FIG. 5.

The rules based engine may log the scan initiation and monitor the scans until they are completed. In this regard, the rules based engine may receive confirmation from each scanning device upon completion of a scanning event. The completion event may also be logged.

After a scan is completed, or after a certain time has elapsed, such as some time period indicating that a scan of a network device has failed, such as from shutting down or being reset, the rules based engine may re-assess the rules in the rule set and schedule additional scanning if needed, as shown in block 510, based on data in the log. For instance, if a network device shuts down during scanning, another scan of that network device may be initiated.

Once all of the network devices on the network have been scanned in accordance with the rules in the rule set, the rules based engine may not schedule additional scans until the target frequency time, which may also be defined in the rule set, has passed. At this time, the rules based engine may resume scanning in accordance with the rules in the rule set. In this regard, the method 500 may be repeated. In addition to log data, the rules based engine may query to determine whether particular assets have not been scanned within a predefined time period, to assure all network devices are scanned within their required time period for scanning.

In some instances, the rules based engine may trigger a scan as soon as a new device is added to the network inventory. Further, when a new device is added to the network inventory, a new rule set taking into account the new device may be generated as outlined above.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer implemented method comprising:
   (i) identifying, by one or more processors, an initial group of network devices from a set of network devices, the initial group of network devices being identified in accordance with a rule set wherein the rule set includes at least one rule for constraining the initial group of network devices from including one or more subsets of network devices, in the set of network devices, that cannot be scanned simultaneously;
   (ii) initiating, by the one or more processors, a scan of the initial group of network devices;
   (iii) determining, by the one or more processors, in accordance with the rule set, an additional group of network devices from the set of network devices to be scanned after the scan of the initial group of network devices, wherein the rule set includes at least one additional rule for constraining the additional group of network devices from including the one or more subsets of network devices;
   (iv) initiating, by the one or more processors, a scan of the additional group of network devices; and
   repeating (iii) and (iv) until all network devices in the set of network devices are scanned in accordance with the rule set.

2. The method of claim 1, wherein identifying the initial set of network devices includes identifying the largest number of network devices that can be scanned in accordance with the rule set.

3. The method of claim 1, wherein initiating the scan of the initial group of network devices includes providing instructions to one or more scanning devices, the instructions including an identification of each network device in the initial group of network devices.

4. The method of claim 3, wherein the instructions further identify which network device, in the initial group of network devices, each scanning device of the one or more scanning devices is to scan.

5. The method of claim 3, further comprising, prior to initiating the scan of the additional group of network devices, receiving confirmation that the scan of the initial group of network devices is complete.

6. The method of claim 1, wherein initiating the scan of the additional group of network devices includes providing instructions to one or more scanning devices, the instructions including an identification of each network device in the additional group of network devices.

7. The method of claim 6, wherein the instructions further identify which network device, in the additional group of network devices, each scanning device of the one or more scanning devices is to scan.

8. A system comprising:
one or more processors; and
one or more storage devices in communication with the one or more processors, wherein the one or more storage devices contain instructions configured to cause the one or more processors to:
(i) identify an initial group of network devices from a set of network devices, the initial group of network devices being identified in accordance with a rule set, wherein the rule set includes at least one rule for constraining the initial group of network devices from including one or more subsets of network devices, in the set of network devices, that cannot be scanned simultaneously;
(ii) initiate a scan of the initial group of network devices;
(iii) determine in accordance with the rule set, an additional group of network devices from the set of network devices to be scanned, wherein the rule set includes at least one additional rule for constraining the additional group of network devices from including the one or more subsets of network devices;
(iv) initiate a scan of the additional group of network devices; and
repeat (iii) and (iv) until all network devices in the set of network devices are scanned in accordance with the rule set.

9. The system of claim 8, wherein identifying the initial set of network devices includes identifying the largest number of network devices that can be scanned in accordance with the rule set.

10. The system of claim 8, wherein initiating the scan of the initial group of network devices includes providing instructions to one or more scanning devices, the instructions including an identification of each network device in the initial group of network devices.

11. The system of claim 10, wherein the instructions further identify which network device, in the initial group of network devices, each scanning device of the one or more scanning devices is to scan.

12. The system of claim 10, wherein the instructions are further configured to cause the one or more processors to, prior to initiating the scan of the additional group of network devices, receive confirmation that the scan of the initial group of network devices is complete.

13. The system of claim 8, wherein initiating the scan of the additional group of network devices includes providing instructions to one or more scanning devices, the instructions including an identification of each network device in the additional group of network devices.

14. The system of claim 13, wherein the instructions further identify which network device, in the additional group of network devices, each scanning device of the one or more scanning devices is to scan.

15. A non-transitory computer-readable medium storing instructions, which when executed by one or more processors, cause the one or more processors to:
(i) identify an initial group of network devices from a set of network devices, the initial group of network devices being identified in accordance with a rule set, wherein the rule set includes at least one rule for constraining the initial group of network devices from including one or more subsets of network devices, in the set of network devices, that cannot be scanned simultaneously;
(ii) initiate a scan of the initial group of network devices;
(iii) determine in accordance with the rule set, an additional group of network devices from the set of network devices to be scanned, wherein the rule set includes at least one additional rule for constraining the additional group of network devices from including the one or more subsets of network devices;
(iv) initiate a scan of the additional group of network devices; and
repeat (iii) and (iv) until all network devices in the set of network devices are scanned in accordance with the rule set.

16. The non-transitory computer readable medium of claim 15, wherein identifying the initial set of network devices includes identifying the largest number of network devices that can be scanned in accordance with the rule set.

17. The non-transitory computer readable medium of claim 15, wherein initiating the scan of the initial group of network devices includes providing instructions to one or more scanning devices, the instructions including an identification of each network device in the initial group of network devices.

18. The non-transitory computer readable medium of claim 17, wherein the instructions further identify which network device, in the initial group of network devices, each scanning device of the one or more scanning devices is to scan.

* * * * *